2 Sheets—Sheet 1.
G. P. CLARKE.
TERRESTIAL GLOBE.
No. 69,408. Patented Oct. 1, 1867.
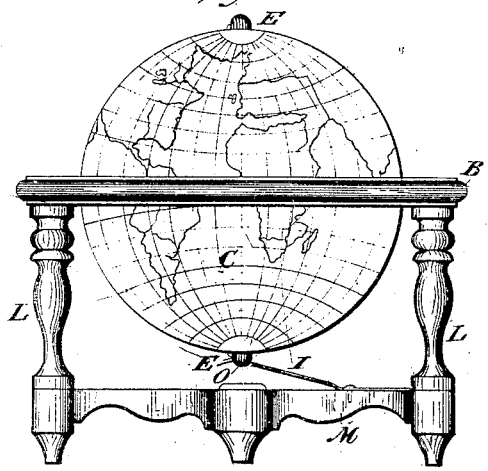
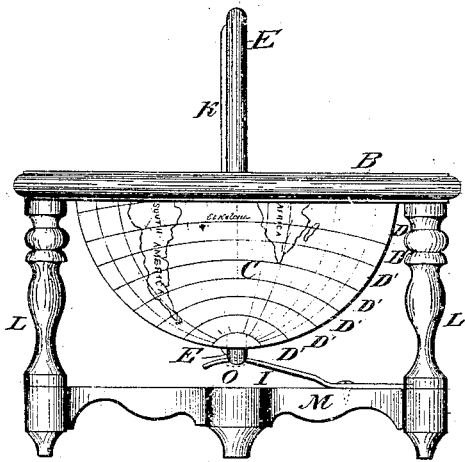
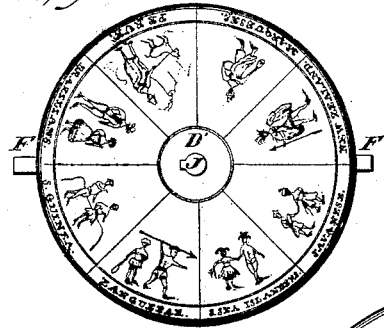
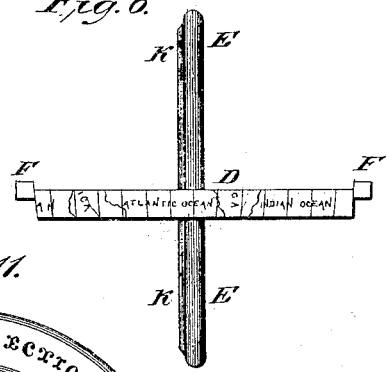
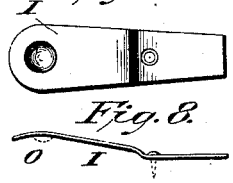
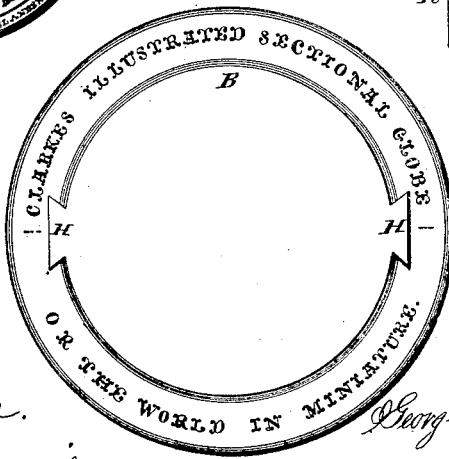
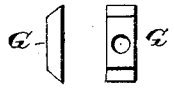
Witnesses.
G. H. Carson.
Geo. W. Francis.
Inventor:
George Pemberton Clarke.

G. P. CLARKE.
TERRESTIAL GLOBE.
No. 69,408.
2 Sheets—Sheet 2.
Patented Oct. 1, 1867.
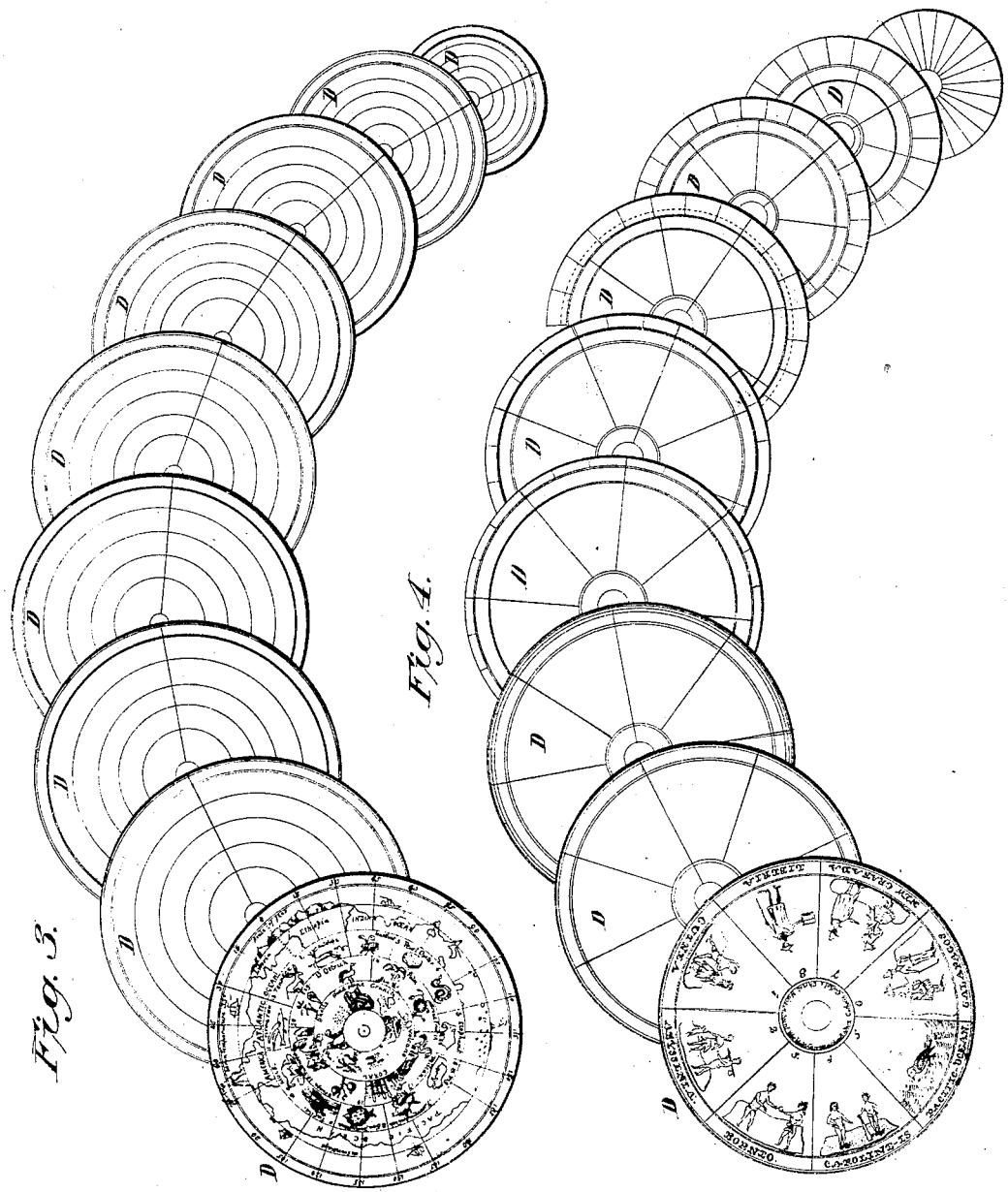
Witnesses.
G. H. Carson
Geo. W. Francis
Inventor:
George Pemberton Clarke.

United States Patent Office.

GEORGE P. CLARKE, OF NEW YORK, N. Y.

Letters Patent No. 69,408, dated October 1, 1867.

IMPROVEMENT IN TERRESTRIAL GLOBES.

*The Schedule referred to in these Letters Patent and making part of the same.*

TO ALL WHOM IT MAY CONCERN:

Be it known that I, GEORGE P. CLARKE, of the city, county, and State of New York, have invented a new and improved mode of constructing and using Artificial Terrestrial Globes; and I do hereby declare that the following is a full and exact description thereof, reference being had to the accompanying drawing, and to the letters of reference marked thereon.

The nature of my invention consists in constructing an artificial terrestrial globe, of separate and distinct sections or zones, upon the inner surfaces of which are represented the animal, vegetable, and mineral kingdoms of the earth, and arranged as hereinafter described.

To enable others skilled in the art to make and use my invention, I will proceed to describe its construction and operation.

Figure 1 represents an elevation of my globe complete, with every piece and part connected.

Figure 2 represents the globe with one-half of the sections or zones taken off for inspection and study.

Figure 3 represents the northern half of the sections or zones taken off, and illustrating the disposition of the animal, vegetable, and mineral kingdoms.

Figure 4 represents the obverse side of fig. 3, showing the disposition of the various races of mankind connected with each and every zone.

Figure 5 represents the middle section, or equator, showing the position of the trunnions or journals upon which the globe turns.

Figure 6 represents an edge view of fig. 5, showing the north and south poles, upon which the sections or zones are secured in their places.

Figure 7 represents the spring I, which secures the globe in an upright position when not turning upon its trunnions.

Figure 8 represents an edge view of spring I, showing the recess O.

Figure 9 represents a top view of the boxes into which the trunnions turn.

Figure 10 represents a side view of said boxes.

Figure 11 represents a plan or top view of the meridian into which the globe turns.

Its Construction.

I construct a stand, consisting of the meridian B, columns L L, and cross-piece M, similar to those used in the ordinary terrestrial globes, figs. 1, 2. I next construct a sphere or globe, C, figs. 1, 2, made of sections or zones D D D D, fig. 3, each section or zone being a separate and distinct piece, and made of sufficient thickness to represent 10° of latitude, as, for instance, from 10° to 20°, from 20° to 30°, from 30° to 40°, and so on up to 90°, making nine sections or zones, fig. 3, which completes one-half of the sphere or globe C, representing the northern hemisphere. Nine other sections or zones of similar construction are also made, D' D' D' D', fig. 2, representing the southern hemisphere, which completes the 180° from the north to the south pole. I also make and insert through the centre of the middle section or zone D, representing the equator, a spindle or axis, E, figs. 2, 6, said axis representing the north and south poles, and being a permanent fixture. I also attach to this middle section or zone two trunnions or journals, F F, figs. 5, 6, at right angles to the poles E E. Upon these trunnions or journals are fitted two boxes G G, figs. 9, 10, which are made to turn easy and free upon said trunnions or journals. These boxes G G are accurately fitted into recesses in the meridian B at H H, fig. 11. A small spring, I, figs. 7, 8, is next attached to the cross-piece M, fig. 1, for purposes hereinafter described. In making the sections or zones D D D D, figs. 3, 5, a hole, J, is left in the centre, which fits accurately the spindle or poles E E, fig. 6, into which is also permanently inserted a key or feather, K, fig. 6, having a corresponding recess in the centre holes J, figs. 5, 3, for the purpose of preserving the respective zones in their longitudinal positions when placed upon the axes or poles E E, figs. 2, 6.

Having explained and described each piece and part, I will now proceed to put my globe together.

Operation.

I first take the middle section or zone D', figs. 5, 6, which represents the equator, and place upon the trunnions or journals F F the boxes G G, figs. 9, 10, which are next inserted in the meridian B at H H, figs. 1, 11, said sections or zone being so adjusted as to turn freely on the trunnions F F, while the spring I, fig. 1, on the cross-piece M, is so arranged that the end of the spindle or poles E E will slip in the recess O in spring I in its revolution, thus holding the said spindle firm in its upright position preparatory to placing the various zones or sections in their respective places. The zones of the northern hemisphere are next taken up in their proper order, beginning with the equator, which embraces 10° of latitude, and from 10° to 20°, and from 20° to 30°, and from 30° to 40°, and so on up to 90°, when the last section or zone is secured by a spring or pin, the former being used on all large globes. The northern hemisphere being now complete, the semi-globe is made to turn on the trunnions or journals F F until the north pole is made to slip in the recess O in the spring I on the cross-piece M, figs. 1, 2, when a similar operation is performed with the remaining sections or zones, which embrace the southern hemisphere, thus completing the entire globe.

Its Object.

The object of this globe is to so arrange the zones that upon the inner surfaces I cause to be represented eight general heads of elementary education, embracing the latitude, longitude, limits of perpetual snows, the elevation of mountains, topographical position of the land and water, the deep-sea soundings, the animals, fishes, birds, vegetation, and geological formation of all the land embraced within this zone for six hundred miles of latitude, as illustrated on the first zone D, fig. 3, which please examine.

The first or outer circles indicating the longitude; the second circle represents the atmospheric space above the level of the ocean, upon which is a scale of feet for reference in connection with the height of mountains; the third circle (colored) illustrates the land and water and deep-sea soundings; the fourth circle is embellished with the indigenous animals belonging to said land; the fifth circle with the birds and vegetation; and the sixth circle shows the geological nature of the above land.

In my application for a patent for a design I shall enter more fully into detail in relation to the pictorial department.

Again, on the opposite side of this same zone, fig. 4, I illustrate the inhabitants around the entire circle of the land belonging to this zone. The description of this zone is the description of the whole eighteen sections, whilst the information is in accordance with the latitude and the characteristics of the respective zones, thus forming a complete, compact, and original world in miniature.

What I claim as my invention, and desire to secure by Letters Patent, is—

1. The division of a sphere or globe into sections or zones, substantially as described and for the purposes set forth.

2. I claim the construction and application of the spring I, in combination with the spindle E E, the trunnions F F, and the centre zone D, substantially as and for the purposes set forth.

GEORGE P. CLARKE.

Witnesses:
    G. HARSIN,
    WALTER J. BRASSINGTON.